July 2, 1935.  W. E. GOBLE  2,006,547
OFFSET DISK HARROW
Filed May 31, 1934  2 Sheets-Sheet 1
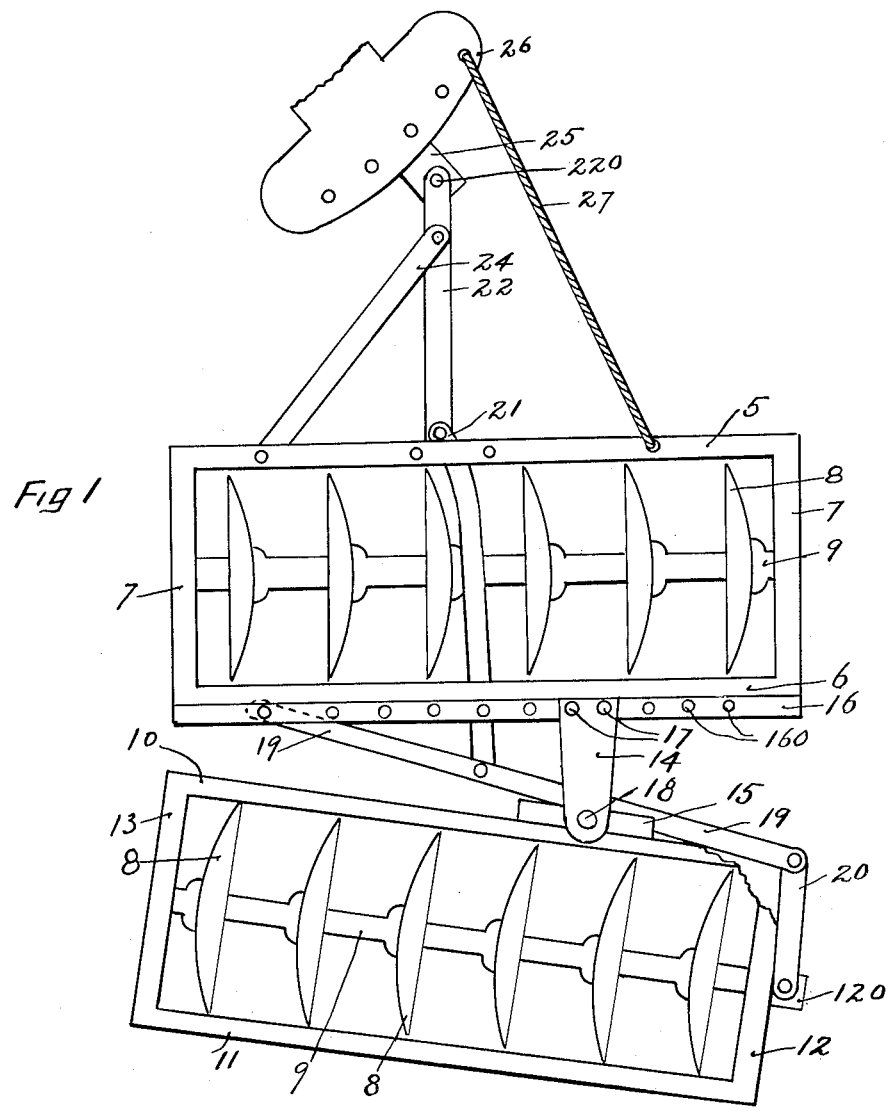
Fig 1
Fig 2
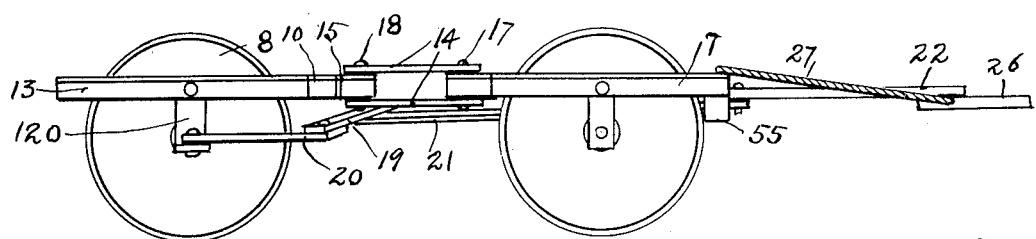
William E. Goble, Inventor
By Francis C. Huebner, Attorney

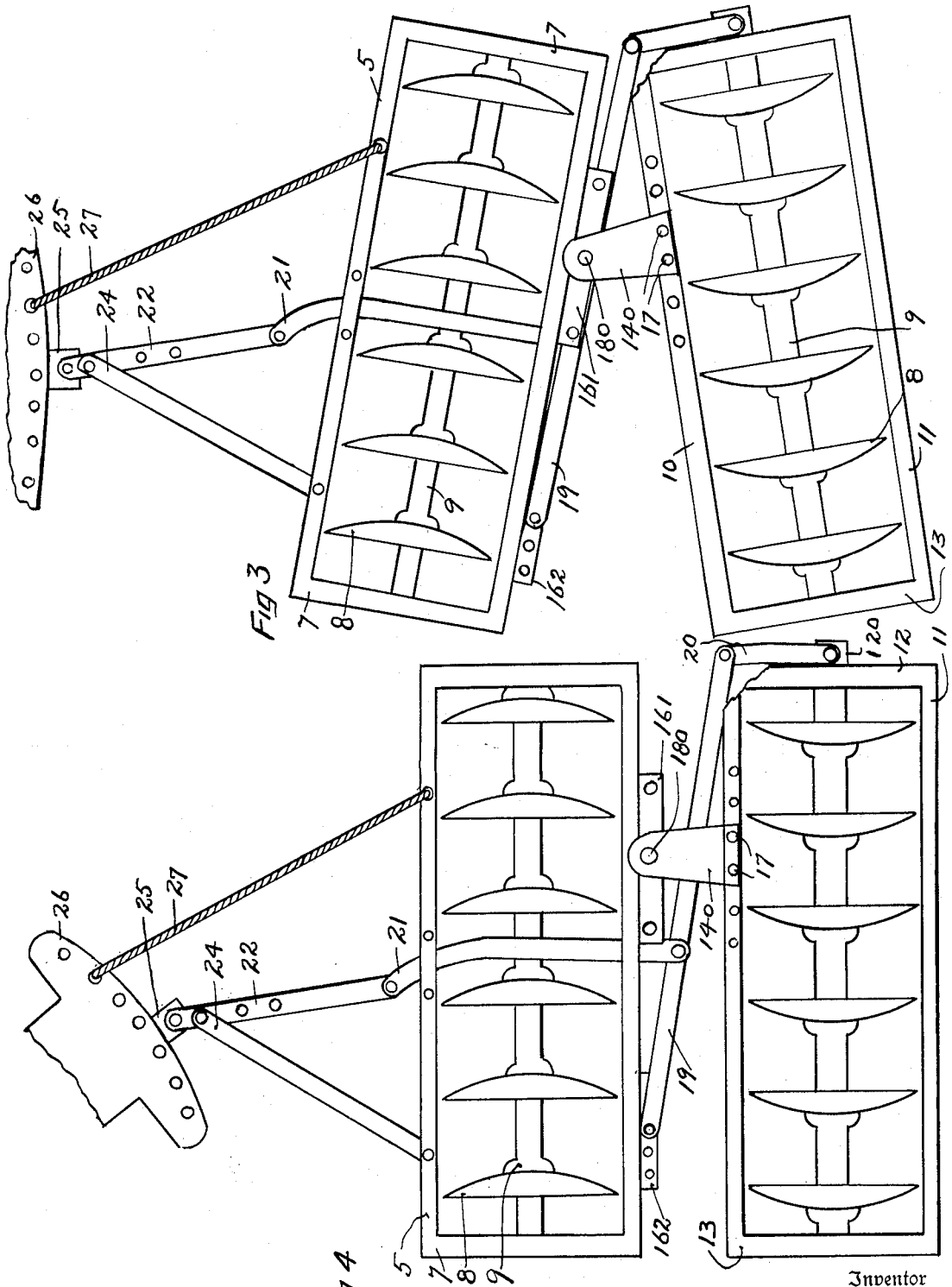

Patented July 2, 1935

2,006,547

UNITED STATES PATENT OFFICE 2,006,547

OFFSET DISK HARROW

William E. Goble, Selma, Calif.

Application May 31, 1934, Serial No. 728,399

3 Claims. (Cl. 55—83)

My invention relates to an offset disk harrow. An offset disk harrow is usually constructed of two unit sections. Each unit section has a plurality of disk blades positioned in the section with the concave faces of the disks uniformly facing the same direction. The two sections are assembled with the concave faces of the one section facing the opposite direction to the concave faces of the cooperating unit section. When these unit sections are adjusted for work, they are arranged in the form of a V with relation to each other, and the draft is applied to one side of the V between the apex of said V and the opposite end of one of the stems. When the sections of the harrow are thus assembled it is noted that in turning the disk it will be comparatively easy to turn toward the apex of the V, but it is practically impossible to turn toward the open end of the V. The object of my invention is the construction of an offset disk harrow constructed of a front and rear section that can be easily turned toward the left or toward the right. Another object is the construction of an offset disk that regardless of the condition of the soil or growth on the soil the two sections will remain in formation for working the earth so long as it is being pulled forward. Another object is the formation of an offset disk harrow the sections of which are adapted to fold together when turning toward the open end of the harrow, but which will interlock when in operative position when being pulled forward. Other objects will be hereinafter disclosed.

These objects are accomplished by means of the device hereinafter described and illustrated on the accompanying drawings in which Fig. 1 shows a top plan view of the disk harrow with my invention incorporated therewith, in which the sections comprising said harrow have, in turning, automatically assumed an approximate V formation, which is the reverse of the V formation necessary for operating as a harrow. Fig. 2 is an end view of the device as shown in Fig. 1. Fig. 3 is a slightly modified form of disk harrow in formation for tilling the soil. Fig. 4 is a similar view of the form shown in Fig. 3 showing an automatic adjustment of the two sections relative to each other in turning.

Referring to the drawings, and more specifically to Fig. 1, I have formed an offset disk harrow consisting of front and rear sections. The front section comprises a frame approximately rectangular in shape. To strengthen the tool I have preferred to form the frame integral which is easily done by welding, but the rails forming the frame can be attached together by any well known means. The front section frame has a front rail 5, a rear rail 6 and ends 7. A plurality of disk blades 8 are spaced apart by spacers 9, and the assembled spacers and disk blades are adapted to rotate on an axle, not shown in the drawings, which axle extends lengthwise through the spacer and disk assembly, said axle being attached to either end of the frame. This specific form of assembly of disk blades, spacers, axle and bearings is more fully disclosed in United States Patent issued to me October 31, 1933, Patent Number 1,932,619. It is noted that my present invention can be applied to other forms of offset disk earth working tools in which two sections are hinged together.

The rear section of the disk harrow is constructed similarly to the front section. For convenience of description to follow I have designated the front rail of the rear section as 10, the rear rail 11, the right end 12, and the left end 13.

For the purpose of strengthening the frame I have attached an auxiliary rail 16 to rail 6.

It is also noted that in the following description, and in the drawings I have shown offset disk harrows in which the apex of the V is at the right when the harrow is in operative formation. My invention can readily be applied as well to offset disk harrows which may be built with the apex of the V at the left side when in operative formation.

In my invention the front and rear sections comprising the harrow or earth working tool are hinged together by a hinge consisting of a plate 14 which is rigidly attached to auxiliary rail 16 by bolts 17. The opposite end of plate 14 is attached by pivot 18 to a bracket 15, which bracket is attached to rail 10. The position of this hinge should be between the longitudinal center of rails 6 or 10, and the right end of said sections. Holes 160 in auxiliary rail 16 are for the purpose of making adjustments of the hinge, or the beam 19 hereinafter referred to.

A beam 19 is pivotally attached at one end to auxiliary rail 16. The opposite end of the beam is pivotally attached to an arm 20, which arm is pivotally attached to a bracket 120, said bracket being attached to end member 12. At a point on beam 19 between the two ends is pivotally attached a connecting arm 21. Connecting arm 21 should extend to, or beyond the front rail 5. It passes between two of the disk blades and a slide guide 55. A draw bar 22 is pivotally attached at one end to connecting arm 21, and at the other end to tractor hitch 25. A brace 24 extends from draw bar 22 to rail 5, said brace being pivoted at either end.

In the drawings I have shown an auxiliary tractor hitch 26 which has a plurality of holes to the right and to the left of the center of the hitch. The hitch 25 shown consists of a bar which can be used as shown if desired, but the objects of my invention can be accomplished by using the auxiliary tractor hitch 26 only, and by pivotally connecting the draw bar 22 to said auxiliary hitch. I have attached a cable 27 at one end to auxiliary tractor hitch a spaced distance from the point where the draw bar is attached thereto, and the other end is attached to rail 5 at a point to the right of the lateral center of said rail. The cable should be of such length that in turning, when the tractor hitch swings on its pivot 220 the draft will be transferred from the drawbar 22 to cable 27. It is noted that said cable 27 can be substituted by a chain or a rod.

In Figures 3 and 4 I have shown a slightly different form of construction, the difference being that plate 140, in Figs. 3 and 4, is rigidly attached to rail 10 of the rear section, and the pivot 180 on which the hinge turns is attached to support 161 which support is in turn rigidly attached to rail 6.

The operation of this device is as follows. On a forward movement of the harrow, when it is desired that the device function as a harrow, the two sections of the disk normally assume the position shown in Fig. 3, in which position the disks are set at an angle for cutting. Through the combination of draw bar 22, connecting arm 21, beam 14, and arm 20, the pull from the tractor is communicated approximately to the center of the end 12 of the rear section, and regardless of soil conditions, the forward pull holds the two sections in a V relation with each other. It is only when the draft on the draw bar is released, and the draft is communicated to the right half of the front section will the two sections fold together. When the tractor starts to turn toward the left as shown in Figs. 1 and 4, the draft on the drawbar 22 is released, and said draft is transferred to cable 27, the pull or draft on the end 12 of the rear section is also released, and the two sections will draw together in a parallel relation, and if the turn is short enough, they will draw together in a V relation with the apex of the V toward the left. In either the parallel relation or in the V relation with the apex at the left, the harrow can be easily turned toward the left.

It is also noted that while I have confined my description to an offset disk harrow, the same principle applies to any earth working tool operating similarly to an offset disk harrow.

Having described my invention I claim as new and ask for Letters Patent.

1. In an offset disk earth working tool constructed with a front and back section hinged together, and in combination with a hitch having a plurality of means spaced apart adapted to attach draw bar means, of means for connecting said hinged sections with said hitch consisting of a beam pivotally connected at one end to the rear portion of the front section between the lateral center of said section and one end thereof, said beam extending to the opposite end of the rear section, an arm adapted to pivotally connect the end of said beam with said rear section at the approximate center of said end of said section, a draw bar pivotally connected to said beam between the ends thereof, and to said hitch, and a cable attached at one end to the hitch a spaced distance from the point to which the draw bar is attached, the opposite end of said cable being attached to the front section between the lateral center of said section and the end opposite to which the beam is attached to said section.

2. In an offset disk harrow having a front and a rear section hinged together a spaced distance apart, and adapted to be moved on said hinge to be parallel with each other, and adapted to be moved so that said sections can form a V with the apex of the V either to the right or to the left, of means for connecting said disk assembly with a draft consisting of a beam pivotally attached to the front section at a point between the lateral center of said section and an end thereof, said beam extending to the opposite end of the rear section, an arm pivotally connected to said beam and to said rear section, a draw bar pivotally attached to said beam between the ends of said beam, and extending transversely across said front section, hitch means attached to draft means, said hitch means being adapted to be pivotally attached to said draw bar, and a cable attached to said hitch means a spaced distance from the point where the draw bar is pivoted thereto, an end of said cable being attached to the front rail of the front section between the lateral center of said section and the end opposite to the end to which the beam is pivoted.

3. In an offset disk harrow having a front and a rear section, the combination of hinge means connecting said sections, said hinge means being positioned at one side of the lateral center of said sections, a beam pivotally attached to the front section on the opposite side of the lateral center of the section on which the hinge is positioned, an arm pivotally connected with the rear section and with said beam, a draw bar pivotally attached to the beam between the ends thereof, said draw bar being adapted to extend transversely across the front section, hitch means adapted to be pivotally connected with the draw bar, and an auxiliary draw bar attached at one end to the hitch a spaced distance from the place where the draw bar is pivotally attached, and one end of said auxiliary draw bar being attached to the front section between the lateral center of said section and the end opposite to the place to which the beam is attached.

WILLIAM E. GOBLE.